US009959329B2

(12) United States Patent
Guisado (10) Patent No.: US 9,959,329 B2
(45) Date of Patent: May 1, 2018

(54) UNIFIED MASTER REPORT GENERATOR

(71) Applicant: Victor Silva Guisado, Heidelberg (DE)

(72) Inventor: Victor Silva Guisado, Heidelberg (DE)

(73) Assignee: SAP SE, Walldorf (DE)

( * ) Notice: Subject to any disclaimer, the term of this patent is extended or adjusted under 35 U.S.C. 154(b) by 572 days.

(21) Appl. No.: 13/934,544

(22) Filed: Jul. 3, 2013

(65) Prior Publication Data
US 2015/0012481 A1 Jan. 8, 2015

(51) Int. Cl.
*G06F 17/30* (2006.01)

(52) U.S. Cl.
CPC .............. *G06F 17/30557* (2013.01)

(58) Field of Classification Search
CPC .. G06F 17/30557; G06F 1/00; G06F 2101/00; G06F 2200/00; G06F 2201/00
USPC .......................................... 707/603
See application file for complete search history.

(56) References Cited

U.S. PATENT DOCUMENTS

| | | | |
|---|---|---|---|
| 6,016,394 A * | 1/2000 | Walker | G06F 8/30 717/104 |
| 7,155,715 B1 | 12/2006 | Cui et al. | |
| 7,577,731 B2 | 8/2009 | Frey et al. | |
| 7,707,557 B1 | 4/2010 | Nikolov | |
| 7,890,452 B2 | 2/2011 | Moore et al. | |
| 7,925,985 B2 | 4/2011 | Moore | |
| 7,979,296 B2 | 7/2011 | Kruse et al. | |
| 8,121,874 B1 * | 2/2012 | Guheen | G06Q 10/063 705/28 |
| 8,181,151 B2 | 5/2012 | Sedukhin et al. | |
| 8,250,525 B2 | 8/2012 | Khatutsky | |
| 8,276,115 B2 | 9/2012 | Bates et al. | |
| 8,296,170 B2 | 10/2012 | O'brien et al. | |
| 8,316,380 B2 | 11/2012 | Keil et al. | |
| 8,336,030 B1 * | 12/2012 | Boissy | G06F 8/71 717/122 |
| 8,380,648 B2 | 2/2013 | Matson et al. | |
| 9,213,734 B2 * | 12/2015 | Skvirski | G06F 17/30359 |
| 2001/0052108 A1 * | 12/2001 | Bowman-Amuah | 717/1 |
| 2002/0065704 A1 | 5/2002 | Wada et al. | |
| 2003/0058277 A1 * | 3/2003 | Bowman-Amuah | 345/765 |
| 2004/0073886 A1 * | 4/2004 | Irani | G06Q 10/06 717/101 |
| 2006/0143034 A1 | 6/2006 | Rothermel et al. | |

(Continued)

*Primary Examiner* — Khanh B Pham
(74) *Attorney, Agent, or Firm* — Schwegman Lundberg & Woessner, P.A.

(57) ABSTRACT

Methods, systems, and computer-readable mediums are provided for generating master reports. For example, a request to generate a master report may be received from a client device. Release data that includes a list of programs being developed is obtained from a program repository tool. Programs from the list of programs matching the search criteria are then identified. Business case data is then obtained from a business case tool for each matching program. Program process data is also obtained from a product and production tool for each matching program. Using an integrity rule, issues in the release data, the business case data, and the program process data are detected. The master report is generated such that the master report includes the release data, the business case data, the program process data, and the detected issues. The master report is then communicated to the client device.

20 Claims, 8 Drawing Sheets

(56) References Cited

U.S. PATENT DOCUMENTS

| | | | |
|---|---|---|---|
| 2007/0027810 A1* | 2/2007 | Longnecker | G06Q 10/10 |
| | | | 705/51 |
| 2008/0127041 A1* | 5/2008 | Gura | G06Q 10/06 |
| | | | 717/101 |
| 2009/0125875 A1* | 5/2009 | Schmitter | G06F 8/20 |
| | | | 717/101 |
| 2012/0041796 A1* | 2/2012 | Miller, Jr. | G06Q 10/06 |
| | | | 705/7.15 |
| 2012/0180071 A1* | 7/2012 | Lesandro | G06Q 10/06 |
| | | | 719/313 |
| 2012/0310699 A1 | 12/2012 | McKenna et al. | |
| 2012/0331036 A1 | 12/2012 | Duan et al. | |

\* cited by examiner

*FIG. 8*

UNIFIED MASTER REPORT GENERATOR

FIELD

In an example embodiment, the present disclosure relates generally to data processing. In particular, some embodiments may provide analytics of information stored in one or more data sources.

BACKGROUND

Companies, businesses, or organizations, large and small, often must rely upon the use of third party or proprietary applications and development process tools in order to build complex software projects. For example, a company may utilize a number of tools to assist in tracking and memorializing certain aspects of the development lifecycle of a program. For example, a traditional development system may host a business case tool to maintain data useful to a program manager to make business strategy decisions, such as whether to proceed with the program, make further investments, and the like. Other development process tools may be used to formalize the business processes used to develop a program, while still other development process tools may be used to track other such data, such as a schedule of upcoming milestones for a program.

Traditional program reporting may involve a program manager determining which development process tools may include relevant data, requesting data from each of the relevant development process tools, and then cross examining the multiple data sets pulled from each of the relevant development process tools. However, such traditional systems of reporting may be comparatively inefficient and error prone, as such traditional systems do not provide any feedback on the consistency and reliability of the data as stored across development process tools.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that describe illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The embodiments described herein may provide techniques of generating master reports from data sources maintained by multiple development process tools. A master report, as used herein, may refer to analytics generated by example embodiments that combine data from the multiple development process tools and include indications where there may be issues with the integrity of the data.

In example embodiments, a request to generate a master report may be received from a client device. Example embodiments may then obtain, from a program repository tool, release data that includes a list of programs that have been previously approved for development. Programs from the list of programs are then matched against search criteria. Business case data is then obtained from a business case tool for each matching program. Business case data may include data relating to the proposed scope of a program, the expected costs of the program, and the expected return on the program. Program process data, from a product and production tool, is also obtained for each matching program. Using an integrity rule, issues in the release data, the business case data, and the program process data are detected. The master report is generated such that the master report includes the release data, the business case data, the program process data, and the detected issues. The master report is then communicated to the client device.

Figure 1:
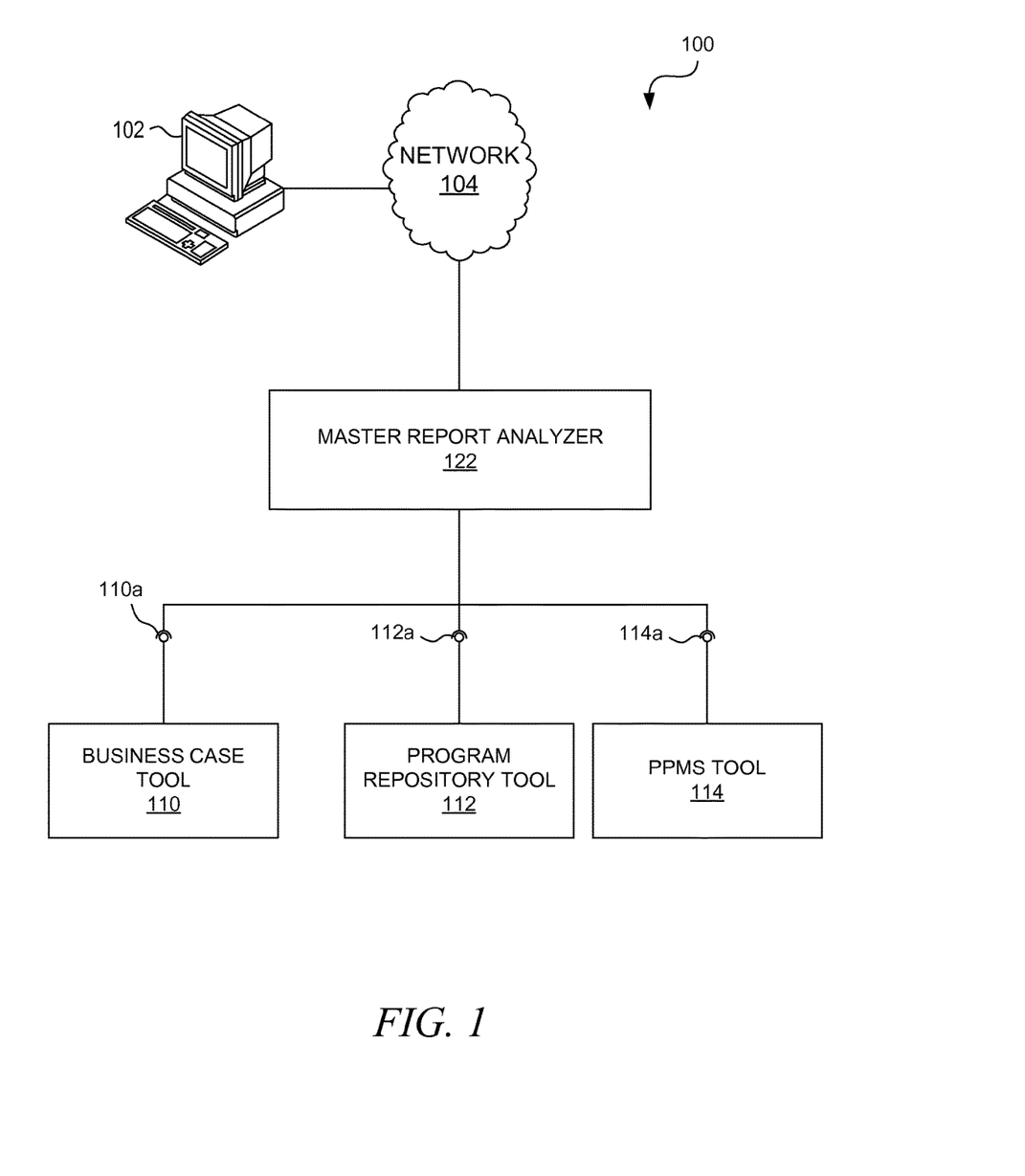
FIG. 1 is a block diagram that illustrates an example of a system for implementing various example embodiments.

FIG. 1 is a block diagram that illustrates an example of a system 100 for implementing various example embodiments. In some embodiments, the system 100 comprises a client device 102, a network 104, a unified master report analyzer 122, and the following project management tools: a business case tool 110, a program repository tool 112, and a product and production management system (PPMS) tool 114. The components of the system 100 may be connected directly or over a network 104, which may be any suitable network. In various embodiments, one or more portions of the network 104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the client device 102, the network 104, the unified master report analyzer 122, the business case tool 110, the program repository tool 112, and the PPMS tool 114, this disclosure contemplates any suitable arrangement or configuration of the client device 102, the network 104, the unified master report analyzer 122, the business case tool 110, the program repository tool 112, and the PPMS tool 114.

The client device 102 may be any suitable computing device, such as a smart phone, a personal digital assistant (PDA), a mobile phone, a personal computer (PC), a laptop, a computing tablet, or any other suitable device. The client device 102 may access the unified master report analyzer 122 via the network 104 or via a third-party system.

The unified master report analyzer 122 may include a network-addressable computing system configured to provide a unified interface for managing one or more projects in a program. The unified master report analyzer 122 may be accessed by the other components of system 100 either directly or via the network 104. The unified master report analyzer 122 may generate master reports relating to the lifecycle of a software program.

To provide the master reports, the unified master report analyzer 122 may interface with one or more project management tools, such as the business case tool 110, the program repository tool 112, and the PPMS tool 114. As described above, the business case tool 110 may be a computer-implemented tool for storing or otherwise maintaining data relating to the business case of a program, such as, among other things, a high level description of the scope of the project, an expected investment, and an expected return. The program repository tool 112 may be a computer-implemented tool for storing or otherwise maintaining release data, which may include, for example, data relating to the release plan and strategy information, release schedules, project plan, and the like for an approved program. The PPMS tool 114 may be a computer-implemented tool for storing or otherwise maintaining data relating to information related to the technical delivery of a product, such as data that defines the process for defining, implementing, testing, and delivering software to customers.

The business case tool 110, the program repository tool 112, and the PPMS tool 114 may each expose an application programming interface (API)—interfaces 110a, 112a, and 114a, respectively—to provide access to the data maintained by the respective project management tool. These interfaces may be accessed by the unified master report analyzer 122 according to any suitable technique, such as a web service (e.g., simple object access protocol (SOAP), service-oriented architecture (SOA), representational state transfer (REST) style web resources, resource-oriented architecture (ROA), common object request broker architecture (CORBA), proprietary APIs, and the like).

Figure 2:
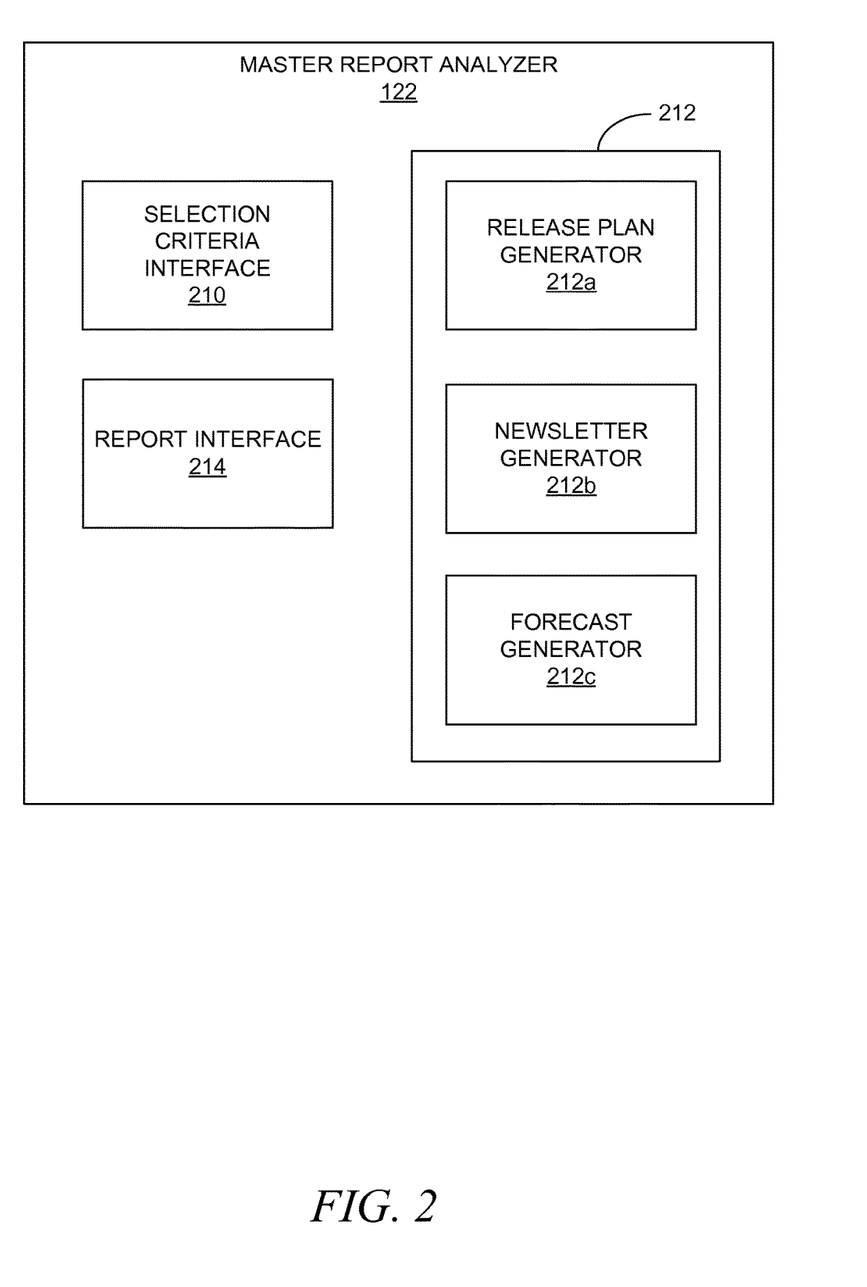
FIG. 2 is a block diagram illustrating example modules of the unified master report analyzer that may generate different types of release master reports, according to an example embodiment.

FIG. 2 is a block diagram illustrating example modules of the unified master report analyzer 122 that may generate different types of master reports, according to an example embodiment. The unified master report analyzer 122 is shown in FIG. 2 to include a selection criteria interface 210 to obtain search criteria usable in generating the different types of release master reports, a master report generator 212 to generate various types of master reports, and a report interface 214 for communicating the generated master reports to the user.

As shown in FIG. 2, the master report generator may include a release plan generator 212a to generate a release plan master report, a newsletter generator 212b to generate a newsletter master report, and a forecast generator 212c to generate a forecast master report.

It is to be appreciated that although the modules depicted in FIG. 2 are shown to be part of the unified master report analyzer 122, some or all of the modules depicted in FIG. 2 may be part of the client device 102, or any other suitable component of FIG. 1. The modules may be hardware, software, or a combination of hardware and software. The operations of the modules shown in FIG. 2 are described in further detail below.

Figure 3:
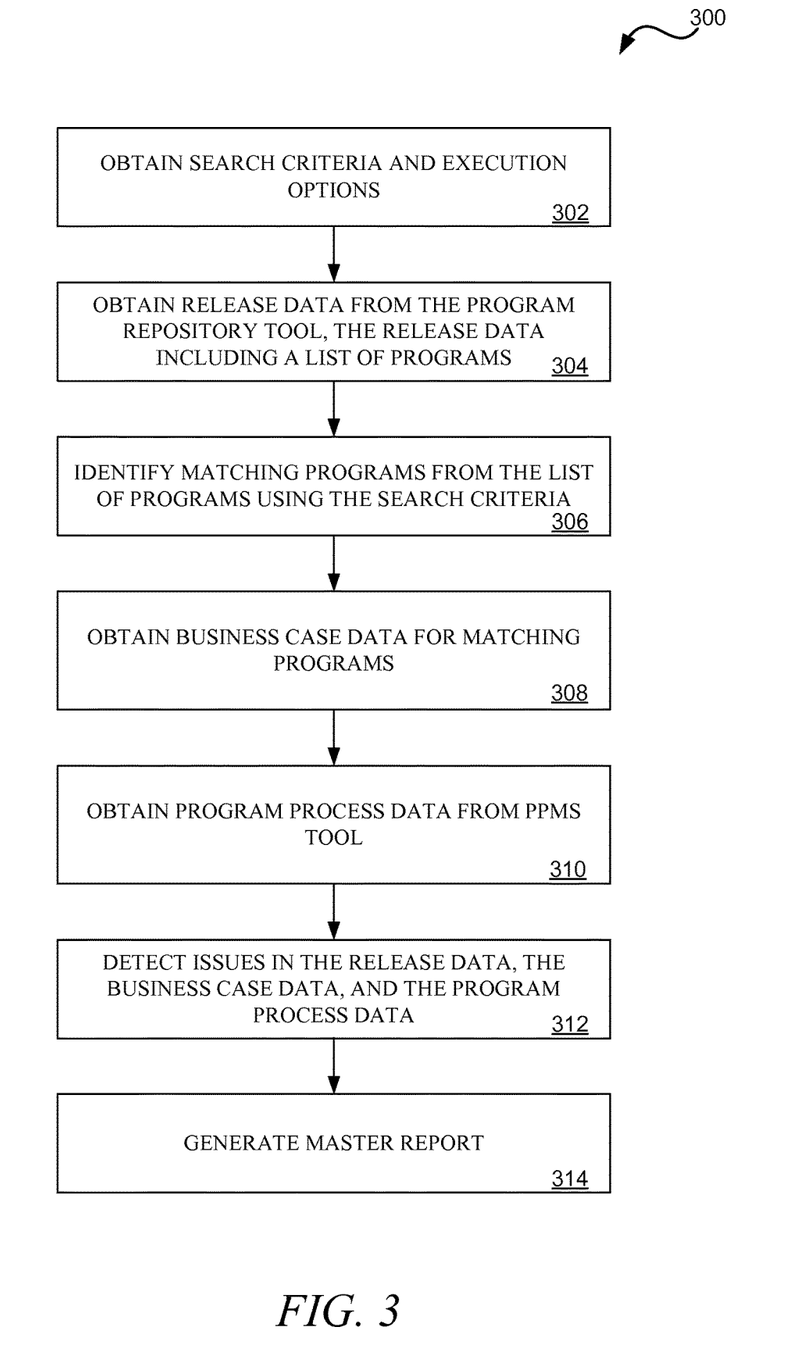
FIG. 3 is a flowchart of a method for generating a master report relating to the status of a program from data collected from one or more program management tools, according to an example embodiment.
Figure 4:
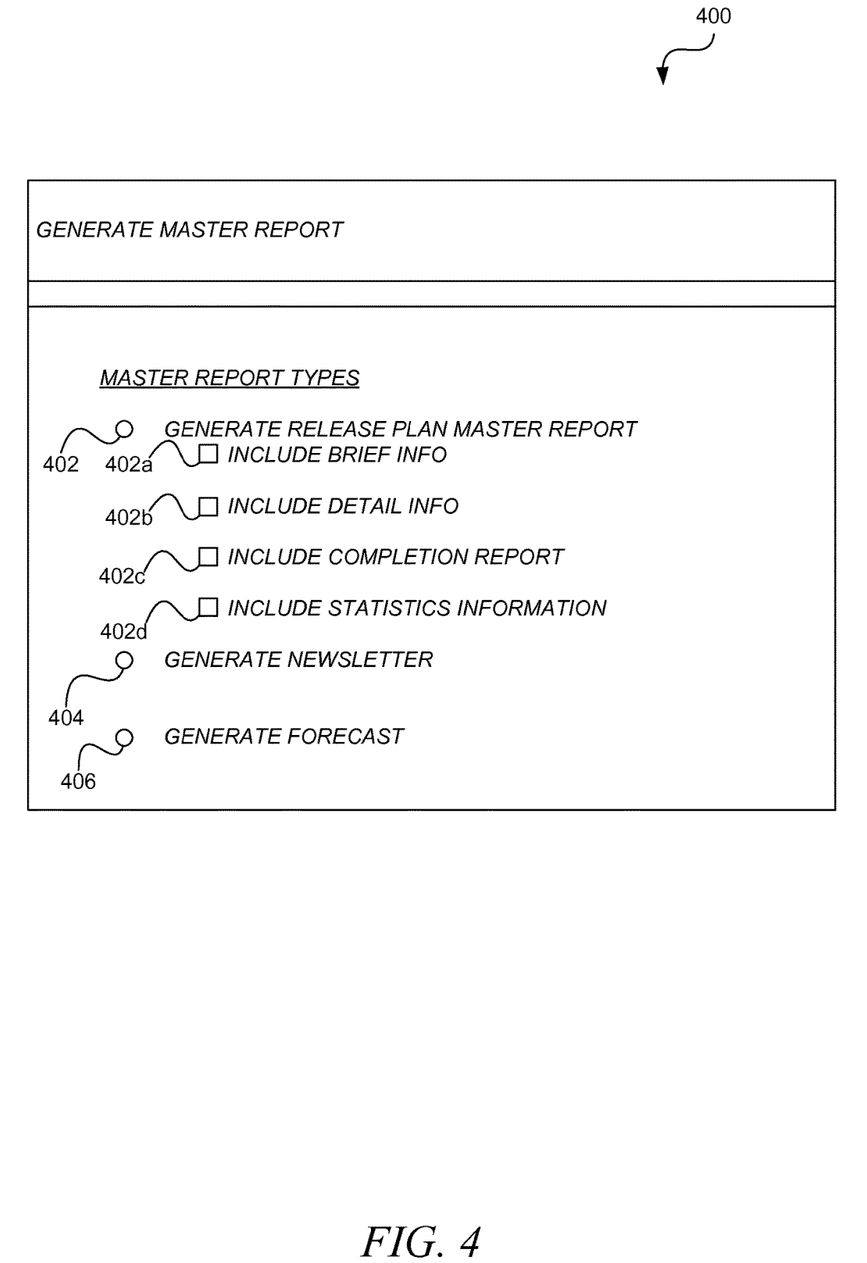
FIG. 4 is a screen capture of a user interface for obtaining search criteria and execution options from a user, in accordance with an embodiment.

FIG. 3 is a flowchart of a method 300 for generating a master report relating to the status of a program from data collected from one or more program management tools, according to an example embodiment. As shown in FIG. 3, the method 300 may begin at operation 302 when the selection criteria interface 210 obtains search criteria and execution options from a user. For example, the selection criteria interface 210 of FIG. 2 may present a user interface that displays user selectable execution options through the client device 102 of FIG. 1. To illustrate, FIG. 4 is a screen capture of a user interface 400 for obtaining search criteria and execution options from a user, in accordance with an embodiment. The user interface 400 may include user selectable execution options for specifying a type of master report that the unified master report analyzer 122 is to generate. For example, the user interface 400 may include a selectable execution option 402 to request generation of a release plan master report, a selectable execution option 404 to request generation of a newsletter master report, and a selectable execution option 406 to request generation of a forecast master report. Further, some execution options may include sub-options for controlling the data included within the master reports. By way of example and not limitation, the release plan master report execution option 402 may include a brief information 402a sub-option for specifying whether the release plan master report is to include a brief summary of the aggregated data (e.g., fields that are designated as important), a detailed information 402b sub-option for specifying whether the release plan master report is to include detailed summary of the aggregated data, a completion report 402c sub-option for specifying whether the release plan master report is to include a completion report that measures the quality of the data stored in the various development process tools, and a statistic sub-option 402d for specifying whether the release plan master report is to include statistical information that measures the number of issues and warnings found for each of the programs.

Although not shown, additional user interfaces may be generated by the selection criteria interface 210 to display search criteria. For example, the selection criteria interface 210 may generate user interfaces configured to obtain filtering criteria that operate to filter out projects based on attributes associated with the development lifecycle of a project. In example embodiments, a project may be filtered based on a role for personnel assigned to the program (e.g., release manager, program lead, and the like), the development or delivery unit (e.g., a team or group within an organization) associated with the project, a time period, program status, program phase, and the like. It is to be appreciated that additional or alternate user interfaces may be generated by the selection criteria interface 210.

Continuing with the method 300 shown in FIG. 3, at operation 304, the master report generator 212 may obtain a list of programs by obtaining the release data from the program repository tool 112. As described above, the program repository tool 112 may store program release data, which may include, for example, a list of programs and corresponding scheduled release dates. This information is generally created when a program is approved for development. Thus, the master report generator 212 may treat the program repository tool 112 as a tool that includes a list of the programs that have been opened in the system.

At operation 306, the master report generator 212 may use the search criteria to identify matching programs from the list of programs obtained from the program repository tool 112. For example, as part of operation 306, the master report generator 212 may identify from the list of programs those programs with a release manager or program manager that matches a role specified by the search criteria. Filtering by role is just one example of using the search criteria to find matching programs and other embodiments may use any suitable attribute associated with the development lifecycle of a project, such as a time period, program status, program phase, and the like.

At operation 308, the master report generator 212 may obtain, from the business case tool 110, business case data for each of the matching programs. As described above, in some cases, business case data is entered into the business case tool 110 and approved before resources (personal, budgets, licenses, etc.) can be assigned to a program and development can begin. In some cases, the business case data may include a high level description of the scope of the program, an expected investment, and an expected return. If approved, the business case data may further include fields that specify an identity of who approved the business case.

At operation 310, the master report generator 212 may obtain program process data from the interface of the PPMS tool 114. The program process data may include data relating to the processes for defining, implementing, testing, and delivering software to customers. An example of the program process data may be a series of tasks that are to be performed in each step or phase of the development process. In some cases, a step may be conditional on the completion of a prior step. The definition of this process and the status of these steps may be included in the program process data.

At operation 312, the master report generator 212 may detect issues by analyzing the business case data, the release data, and the program process data previously obtained. Analyzing the business case data, the release data, and the program process data may involve the master report generator 212 comparing the data fields within the business case data, the release data, and the program process data with integrity rules to detect the presence of any issues. The integrity rules may define conditions that may result in an identification of an issue with the data found in the business case data, the release data, and the program process data. For example, an inconsistency and a warning are examples of different types of issues used to specify the severity of the issue. For example, an inconsistency may be a type of issue that is to be resolved before the program can continue because there is a high likelihood that the inconsistency may impact the program, whereas a warning may be a type of issue that is raised but does not prevent the program from being continued because there is a lower likelihood of impacting the program.

At operation 314, the master report generator 212 may then generate a master report that presents the business case data, the release data, and the program process data previously obtained in conjunction with the detected issues. In some cases, the detected issues may be represented in the master report as a highlighted field of the portions of the business case data, the release data, and/or the program process data on which the detected issue is based. For example, where the integrity rules specify that a release date is to be specified in the release data and the release data lacks a release date, the detected issue may be represented as a highlighted field corresponding to the release date. Such highlighting may improve user readability of an issue in the data stored by the various tools, especially where the issue is the result of an inconsistency across the data stored by the various tools.

As discussed above, the master report generator 212 may be used to generate various types of master reports, as may be performed by the method 300 shown in FIG. 3. Specializations of the method 300 are now described in order to generate different master reports.

Figure 5:
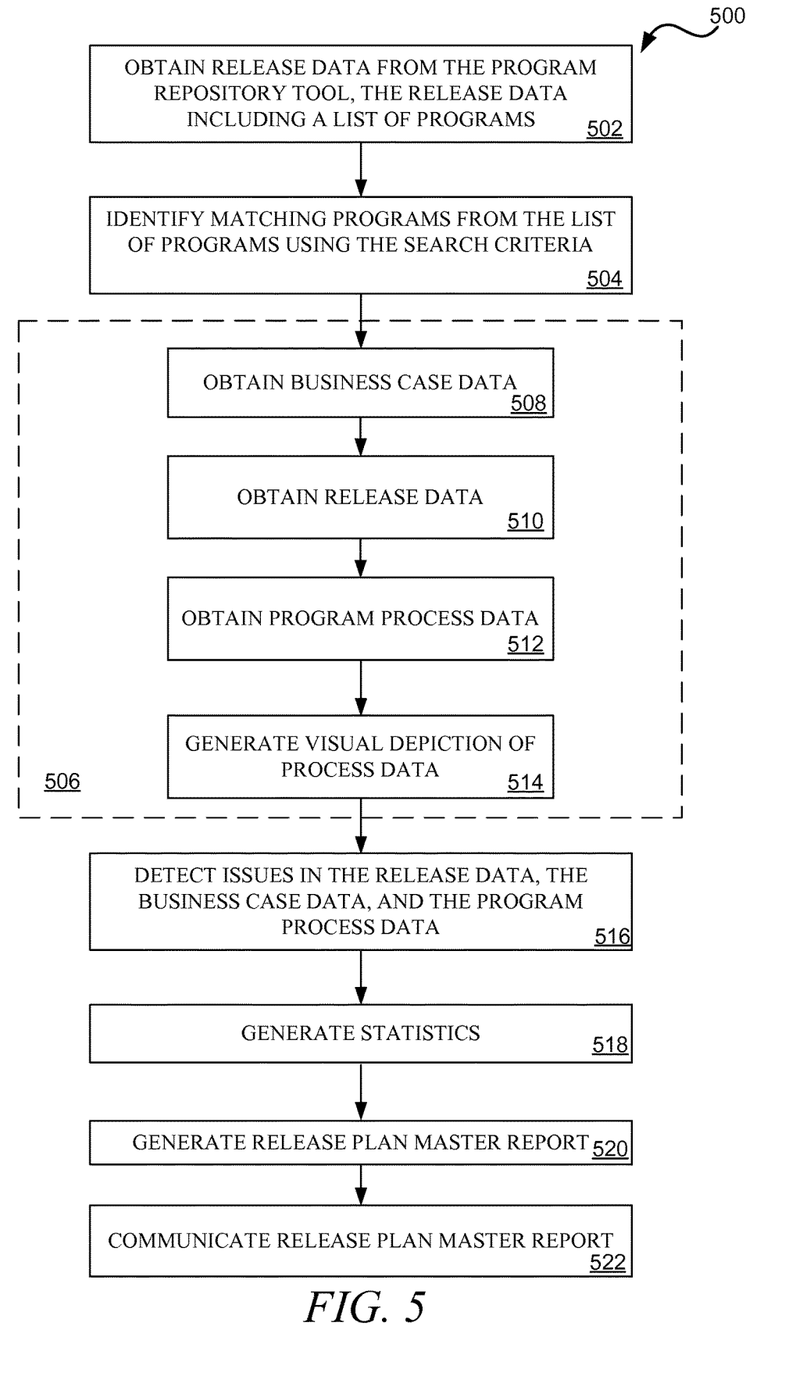
FIG. 5 is a flowchart illustrating a method of generating a release plan master report, according to an example embodiment.

FIG. 5 is a flowchart illustrating a method 500 of generating a release plan master report, according to an example embodiment. In some embodiments, the method 500 may be performed responsive to receiving a user initiated request from the client device 102 of FIG. 1 to generate the release plan master report. See, for example, operation 302 of FIG. 3 and corresponding description for further details regarding the request to generate a master report, such as a release plan master report, according to an example embodiment.

The example embodiment shown in FIG. 5 may begin the method 500 at operation 502 when the release plan generator 212a obtains release data from the program repository tool 112. The release data may include a list of programs that have been approved for development. This operation may operate similar to the operation 304 described above, with reference to FIG. 3.

Then, at operation 504, the release plan generator 212a may use the search criteria to identify matching programs from the list of programs. Operation 504 may operate similar to the operation 306 described above, with reference FIG. 3.

Once the matching programs are identified, the release plan generator 212a may perform the loop 506 for each of the matching programs. For example, the loop 506 may involve, at operation 508, the release plan generator 212a obtaining business case data from the business case tool 110 for the matching program. Further, at operation 510, the release plan generator 212a may obtain release data—such as, milestone data, comments, an action log, and a predecessor program—for the matching program from the program repository tool 112.

At operation 512, the release plan generator 212a may obtain program process data relating to the matching program from the PPMS tool 114.

At operation 514, the release plan generator 212a may generate a visual depiction of the process data. For example, the release plan generator 212a may generate a Gantt chart. In some embodiments, operation 514 may be an optional operation performed responsive to an execution option selected by the user prior to requesting the release plan master report.

After the loop 506 is performed for each matching program, the release plan generator 212a may, at operation 516, detect issues by analyzing the business case data, the release data, and the program process data previously obtained. Analyzing the business case data, the release data, and the program process data involves comparing the data fields with integrity rules to detect the presence of any issues. The integrity rules may define conditions that may result in an inconsistency or a warning. As described above, in some cases, an inconsistency and a warning are different types of issues used to specify the severity of the issue. For example, inconsistencies may be a type of issue that is to be resolved before the program can continue because there is a high likelihood that the inconsistency may impact the program, whereas warnings may be a type of issue that is raised but does not prevent the program from being continued because there is a lower likelihood of impacting the program. The integrity rules that may be used for a release plan master report are described in greater detail below.

In some embodiments, at operation 518, the release plan generator 212a then generates statistics data based on the detected issues. For example, the statistics data may be data representing a number of warnings and/or inconsistencies generated based on analyzing the aggregated program data.

The release plan generator 212a generates the release plan master report (operation 520) and then communicates the release plan master report (operation 522) to the client device 102. The release plan master report may include the aggregated program data, the analytic data, and the statistics data to the user via the client device 102. In some embodiments, the release plan master report may be communicated separately as a data layer and a presentation layer. The data layer may be a data file that specifies the data in the release plan master report, while the presentation layer may be a separate data file that specifies the presentation of the data file. For the purpose of illustration and not limitation, extensible markup language (XML) and HyperText markup language (HTML) are examples of a data layer, while cascading style sheets (CSS) and extensible stylesheet language transformation (XSLT) are example of a presentation layer.

In some cases, the release plan master report may provide insights into the status of a program, such as the number of issues and warnings for a given program manager, time period, or program status. These issues and warnings may be generated based on an analysis of data fields across the multiple tools used by an organization to manage program development. Thus, in some cases, some embodiments may provide a comparatively efficient mechanism for users to obtain the status of programs and to detect inconsistencies in the data used to track the development of those programs.

Figure 6:
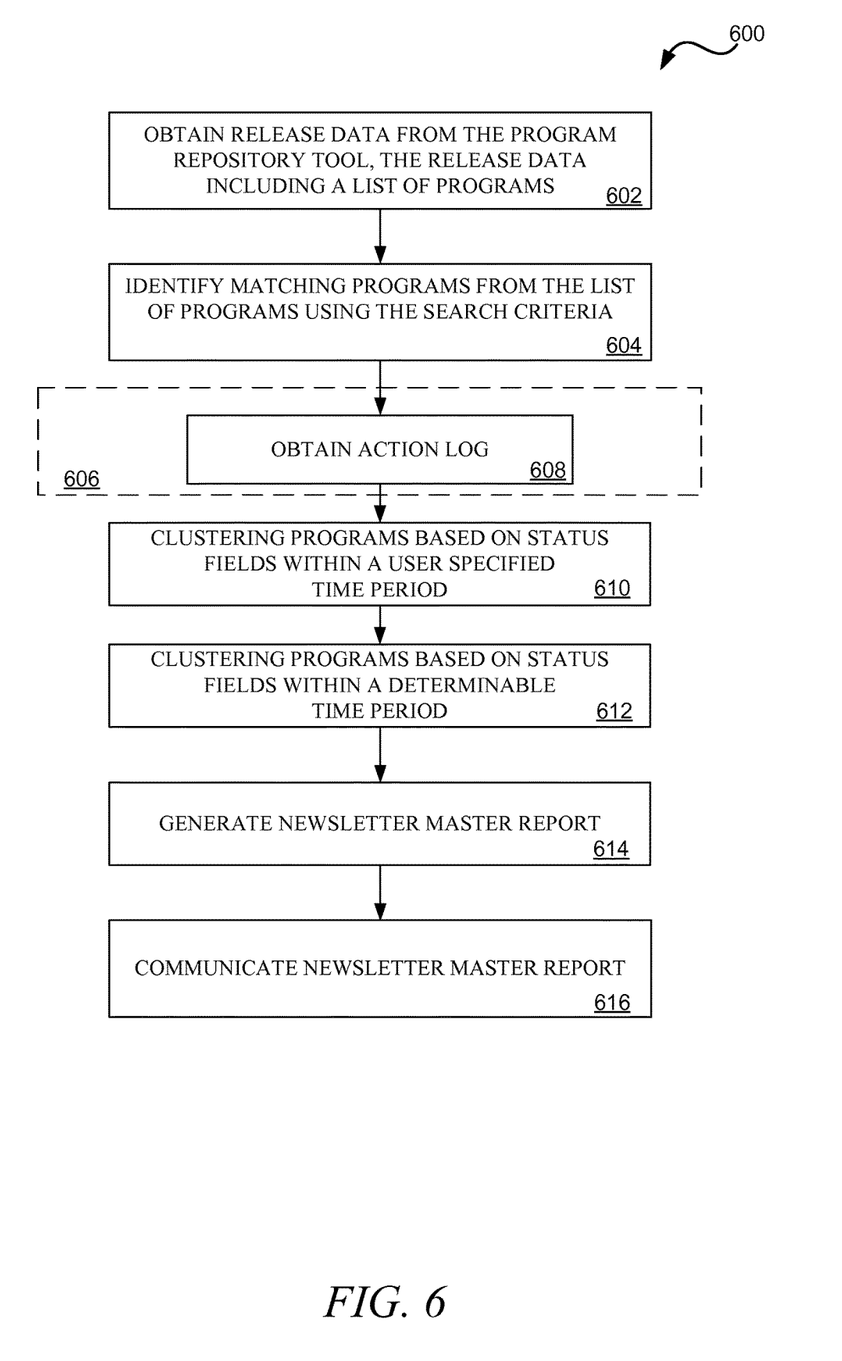
FIG. 6 is a flowchart illustrating an example method for generating a newsletter master report, according to example embodiments.

FIG. 6 is a flowchart illustrating an example method 600 for generating a newsletter master report, according to example embodiments. In some embodiments, the method 600 may be performed responsive to receiving a user initiated request from the client device 102 of FIG. 1 to generate the newsletter master report. See, for example, operation 302 of FIG. 3 and corresponding description for further details regarding the request to generate master report, such as the newsletter master report, according to an example embodiment.

The method 600 may begin at operation 602 when the newsletter generator 212b obtains release data from the program repository tool 112. The release data may include a list of programs that have been approved for development. This operation may operate similar to the operation 304 described above, with reference to FIG. 3.

Then, at operation 604, the newsletter generator 212b may use the search criteria to identify matching programs from the list of programs. Operation 604 may operate similar to the operation 306 described above, with reference FIG. 3.

Once the matching programs are identified, the newsletter generator 212b may perform the loop 606 for each of the matching programs. For example, the loop 606 may involve, at operation 608, the newsletter generator 212b obtaining an action log from the program repository for the matching program. The action log may include status fields that indicate status of a program. In some cases the status fields may be associated with a past or future date in which the status is to be effective.

At operation 610, the newsletter generator 212b may then cluster the matching programs according to status fields within the time period specified by the search criteria. For example, the newsletter generator 212b may cluster a group of programs based on the programs having a status field that indicates that the program will be released to the customer (RTC) or generally available (GA) in the time period specified by the search criteria. The term GA may refer to a point in time when the product is available for the public in general (company specific customers and non-customers). As other examples of clusters, the newsletter generator 212b may organize a group of programs based on the programs having a status field that indicates the programs were approved, cancelled, invalid, or on hold during the time period specified by the search criteria.

At operation 612, the newsletter generator 212b may then cluster the programs according to status fields for statuses scheduled to occur after a determinable time period from the time period specified by the search criteria. For example, in some embodiments, the newsletter generator 212b may organize the programs based on a status field of the programs indicating a RTC status 90 days (or some other determinable time period) after a date specified by the search criteria. The determinable time period may be a data value set by an administrator.

The report interface 214 may generate the newsletter master report at operation 614. The newsletter master report may include the matching programs organized according to the clusters generated at operation 610 and operation 612. For example, the newsletter master report may include one or more sections that list the programs with GA or RTC statuses for the time period specified in the search criteria; the programs with approved statuses for the time period specified in the search criteria; the programs with invalid statuses for the time period specified in the search criteria; the programs with "on hold" statuses for the time period specified in the search criteria; and programs with RTC statuses in the determinable time period following the time period specified in the search criteria.

At operation 616, the report interface 214 may communicate the newsletter master report to the user via the client device 102. In some embodiments, the newsletter master report may be communicated separately as a data layer and a presentation layer. As described above, the data layer may be a data file that specifies the data in the release plan master report (e.g., XML or HTML), while the presentation layer may be a separate data file that specifies the presentation of the data file (e.g., CSS or XSLT).

As may be appreciated by one skilled in the art, the newsletter master report may provide, in some instances, comparatively convenient data analytics for reporting statuses scheduled for one or more programs being developed by a program developer. Such may be the case because the newsletter master report generated by example embodiments may gather data from one or more data sources and then present that data in a manner in which a user (e.g., a program lead) may view to quickly determine which programs are expected to change status in some specified time period. Further, in some cases, an example embodiment may present data analytics that further specify, on a status basis, which programs are expected to have a certain status in a determinable time period (e.g., 90 days) beyond the user specified time period.

Figure 7:
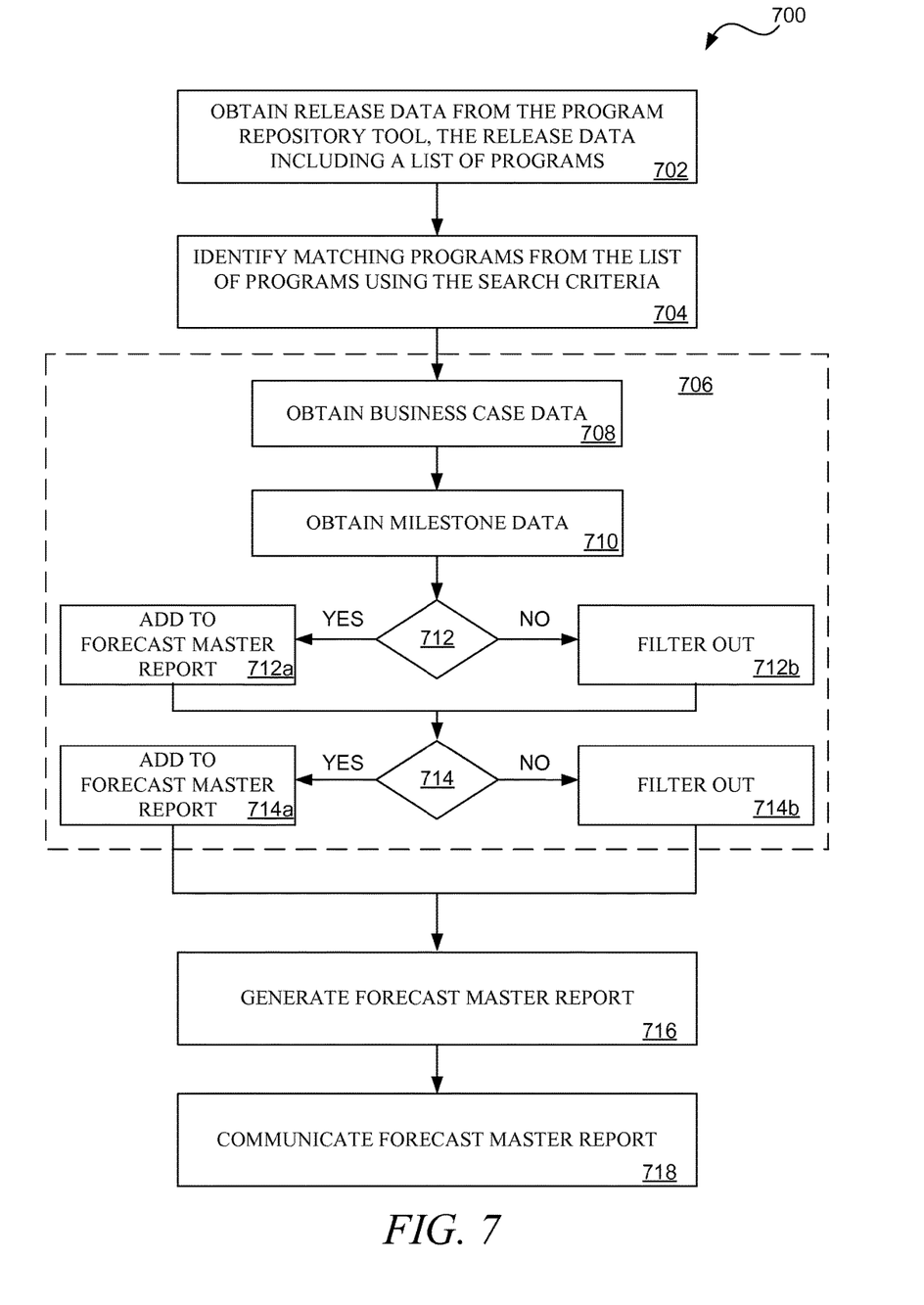
FIG. 7 is a flowchart illustrating an example method for generating a forecast master report, according to example embodiments.

FIG. 7 is a flowchart illustrating an example method 700 for generating a forecast master report, according to example embodiments. Although the method 700 is described as being performed by the forecast generator 212c, it is to be appreciated that the method 700 may be performed, in whole or in part, by any component or module described in this disclosure, such as the client device 102.

The method 700 may begin at operation 702 when the forecast generator 212c obtains release data from the program repository tool 112. The release data may include a list of programs that have been approved for development. This operation may operate similar to the operation 304 described above, with reference to FIG. 3.

Then, at operation 704, the forecast generator 212c may use the search criteria to identify matching programs from the list of programs. Operation 504 may operate similar to the operation 306 described above, with reference FIG. 3.

Once the matching programs are identified, the forecast generator 212c may perform the loop 706 for each of the matching programs. For example, the loop 706 may involve, at operation 708, the forecast generator 212c obtaining business case data from the business case tool 110 for the matching program. As discussed above, the business case data may include, among other things, a high level description of the scope of the project, an expected investment, and an expected return.

Then, at operation 710, the forecast generator 212c may obtain milestone data from the program repository tool 112 for the matching program. The milestone data may, for example, include data representing scheduled events for a program. For example, the milestone data may include data specifying when the program has a delivery (e.g., a main delivery or a support package (SP) delivery). It is to be understood that the term SP may refer to a piece of software delivered to customers that normally includes corrections to known bugs or functionality enhancements.

At decision 712, based on the delivery data in the milestone data, the forecast generator 212c may determine if the program has a delivery date within the selected time period of the search criteria. If yes, then, as shown at operation 712a, the data relating to the program is added to the forecast master report. Otherwise, the program is filtered out from the forecast master report, as is shown at operation 712b.

At decision 714, based on the delivery data in the milestone data, the forecast generator 212c may determine if the program has a relevant status specified by the search criteria. If yes, then, as shown at operation 714a, the data relating to the program (e.g., release data, business case data, and milestone data) is added to the forecast master report. Otherwise, the program is not added to the forecast master report, as is shown at operation 714b. By way of example and not limitation, examples of statuses for programs include: prenominated, nominated, on hold, requested for prenominated, requested, and request-approved by program nomination responsibility (PNR).

After the loop 706 completes, the report interface 214 may generate the forecast master report at operation 716. The forecast master report may list the programs that match the search criteria in conjunction with the milestone data and business case data for those matching programs. In some cases, the integrity of the data from the business case data and the milestone data is checked by comparing the business case data and the milestone data with one or more integrity rules.

At operation 718, the report interface 214 may communicate the forecast master report to the user via the client device 102. In some embodiments, the forecast master report may be communicated separately as a data layer and a presentation layer. As described above, the data layer may be a data file that specifies the data in the release plan master report (e.g., XML or HTML), while the presentation layer may be a separate data file that specifies the presentation of the data file (e.g., CSS or XSLT).

As may be appreciated by one skilled in the art, the forecast master report may provide, in some instances, comparatively convenient data analytics for a program lead or any other user to view the needs of a program based on upcoming milestones. Such may be the case because the forecast master report generated by example embodiments may gather data from one or more data sources and then present that data in a manner in which a user (e.g., a program lead) may view to quickly determine the business case of a program alongside the upcoming milestone for that program.

As described above, one feature that may be employed by example embodiments is the use of integrity rules that may be executed to detect issues with the data obtained across the various development process tools. By way of example and not limitation, Table 1 below identifies sample integrity rules that may be utilized, in whole or in part, by example embodiments.

TABLE 1

| Trigger | Issue Type | Solution |
| --- | --- | --- |
| If a data field indicates that the program is an 'AddOn' program and the 'based on' field is empty or includes an invalid identifier (e.g., an identifier to a non-existing program). | Inconsistency | Maintain the 'based on' field to identify a valid, existing program. |
| If the PPMS leading object field is empty after the planning to development (P2D) date has been reached. | Inconsistency | Link a PPMS PV to the program |
| If a data field indicates that the program is a 'content' program and the program is not based on an existing program. | Inconsistency | Maintain the 'based on' field to identify a valid, existing program. |
| If a field that indicates an "End of Mainstream Maintenance (EOMM) Date, and the field indicates that the EOMM date is within a determinable time from now (e.g., 90 days). | Warning | N/A |
| If a field that indicates an "End of Mainstream Maintenance (EOMM) Date, and the field indicates that the EOMM date has already occurred. | Warning | N/A |
| If development in support package (dev in SP) program, a 'GA milestone' is maintained, and the 'GA milestone' differs from the given RTC date. | Inconsistency | Delete the GA milestone or set its date to be equal to the RTC date. |
| If a data field indicates that the program is an indirect program and the GA milestone is empty or invalid. | Warning | Maintain the GA milestone in the release plan via a reference to the leading program GA milestone. |
| If a data field that specifies a maintenance strategy is not maintained or set to a value indicating that the strategy is not yet defined. | Inconsistency | Select a valid maintenance strategy. |
| If no public release plan in the status "public" is found. | Inconsistency | N/A |
| If a data field specifies an on demand delivery and a data field specifies an early adoption release type. | Inconsistency | Change release type |
| If a shipment type is not specified for a dev in SP or comprised component program. | Inconsistency | Maintain appropriate portfolio category |
| If dev in SP is not set to 'Available' when RTC is reached. | Inconsistency | Update the PPMS availability field to 'Available.' |
| If a status field specifies a RTC synchronization status, and that status field is set to RTC exception required. | Warning | N/A |

TABLE 1-continued

| Trigger | Issue Type | Solution |
|---|---|---|
| If a status field specifies a RTC synchronization status, and the RTC is outside the release window. | Warning | N/A |
| If a data field that specifies an official product name does not have a valid value and the P2D quality gate has been passed. | Inconsistency | Maintain official product name in the PPMS. |
| If the release plan does not include an EOMM milestone. | Inconsistency | Add the EOMM milestone to the release plan. |
| If the release plan does not include a start of planning phase milestone. | Inconsistency | Add the start of planning phase milestone to the release plan |
| If the release plan does not include a P2D Q-Gate milestone. | Inconsistency | Add the P2D Q-Gate milestone to the release plan |
| If the release plan does not include a development to production (D2P) Q-Gate milestone. | Inconsistency | Add the D2D Q-Gate milestone to the release plan |
| If the release plan does not include a correction close (CC) milestone. A CC milestone may define a point in time when the software is to be completed, tested, and without any major known errors. | Inconsistency | Add the CC milestone to the release plan |
| If the release plan does not include an emergency correction close (ECC) milestone. An ECC milestone may define a point in time that, if an error is found during test and CC is already due, the ECC is the latest point in time in which the software can be modified. | Inconsistency | Add the ECC milestone to the release plan |
| If the release plan does not include a planned availability milestone. | Inconsistency | Add the planned availability milestone to the release plan |
| If the release plan does not include a GA milestone. | Inconsistency | Add the GA milestone to the release plan |

It is to be appreciated that the sample integrity rules shown in Table 1 are provided by way of example and not limitation. Accordingly, some embodiments may use more or less integrity rules than that shown in Table 1.

Example Computer Systems

Figure 8:
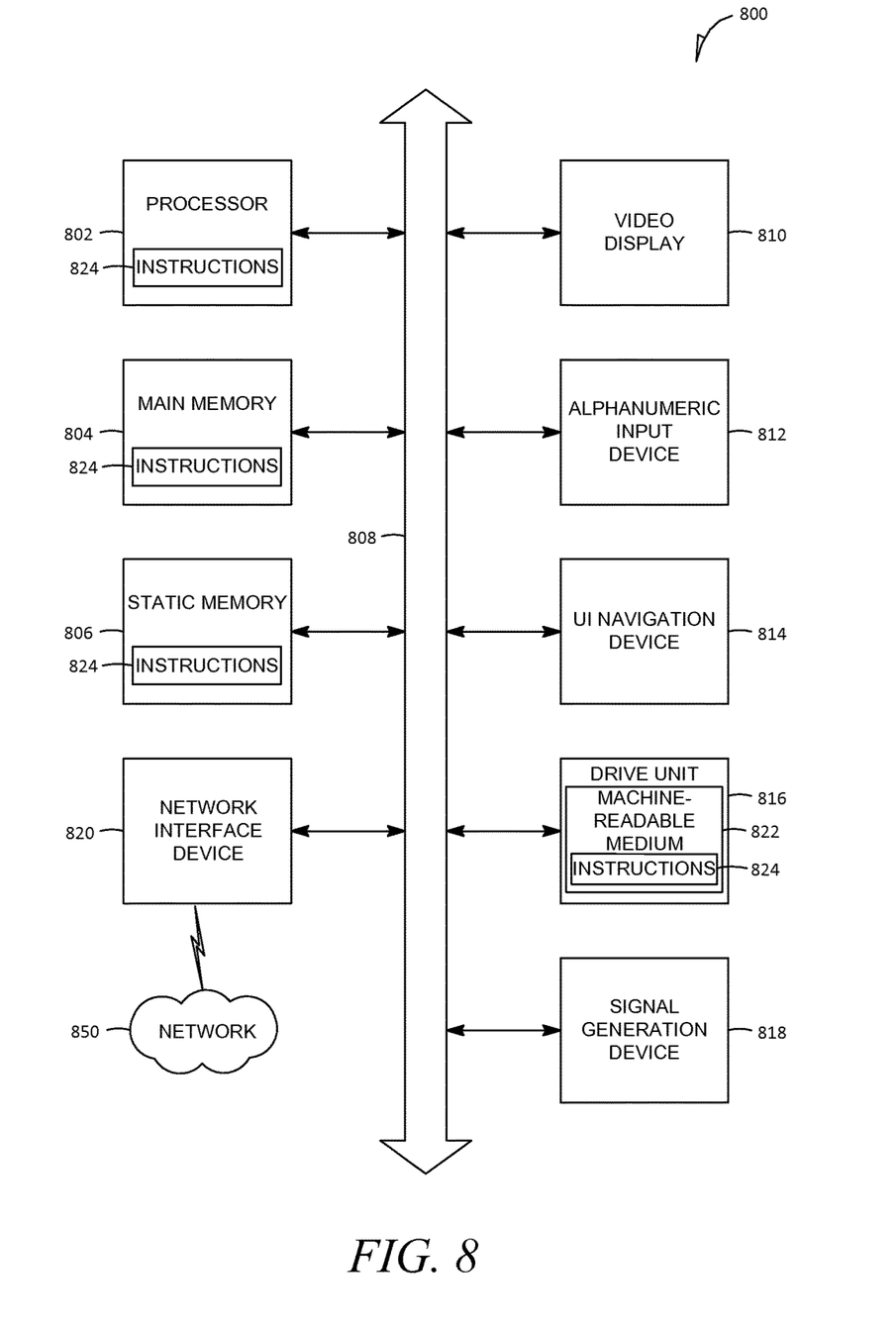
FIG. 8 depicts a block diagram of a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random access memory), which communicate with each other via bus 808. The computing device 800 may further include video display unit 810 (e.g., a plasma display, a liquid crystal display (LCD) or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
receiving at a master report analyzer executed by one or more processors, from a client device, a request to generate a master report that combines data from a program repository tool, a business case tool, and a product and production management tool, the request including filtering criteria to filter programs by one or more attributes associated with a development lifecycle of a program and execution options specifying at least one of a type of master report or data to be included within the master report;
by the master report analyzer,
obtaining, from the program repository tool, a list of programs that have been previously approved for development;
identifying, from the list of programs, programs that match the filtering criteria;
obtaining release data, from the program repository tool, for each matching program;
obtaining business case data, from the business case tool, for each matching program;
obtaining program process data, from the product and production tool, for each matching program;
using the one or more processors, analyzing data fields across the program repository tool, business case tool, and product and production tool based on comparison with one or more integrity rules defining conditions triggering identification of an issue and a manner of resolving the identified issue to detect data-integrity issues in the release data, the business case data, and the program process data, the data-integrity issues comprising one or more data fields that are empty, inconsistent, or include invalid data and that can be updated to resolve the data-integrity issues, at least some of the data-integrity issues resulting from inconsistencies between data stored by the repository tool, business case tool, and product and production tool; and
generating a master report, in accordance with the execution options, that includes the release data, the business case data, the program process data ad the detected issues; and
communicating the master report to the client device.

2. The method of claim 1, wherein the filtering criteria includes at least one of:
a user identifier, a role for personnel assigned to a program, a delivery unit, a time period, a program status, or a program phase.

3. The method of claim 1, wherein the program process data includes data specifying a business process that includes one or more tasks involved in completing a development phase in a program.

4. The method of claim 1, wherein the business case data includes at least one of a program scope, an expected investment, or an expected return.

5. The method of claim 1, further comprising generating a visual depiction of the process data for addition to the master report responsive to the execution options.

6. The method of claim 1, wherein the detected issues include issues of different levels of severity.

7. The method of claim 6, wherein the different levels of severity are represented by different colors being applied to portions of the release data, the business case data, and the program process data that cause the detected issues.

8. The method of claim 1, further comprising:
obtaining, from the program repository tool, an action log for each matching program, the action logs each specifying status changes for the corresponding program; and
based on the action log, clustering the matching programs based on the status changes occurring within a time period specified by the filtering criteria for addition of the clustered matching programs in the master report responsive to the execution options.

9. The method of claim 8, further comprising, based on the action log, clustering the matching programs further based on the status changes occurring within a determinable time period beyond the time period specified by the filtering criteria.

10. The method of claim 1, wherein generating the master report comprises:
obtaining, from the program repository tool, milestone data for each matching program, the milestone data each specifying scheduled events within the product development for the corresponding program; and
determining, for each of the matching programs, whether the program includes a scheduled event within a time period specified by the filtering criteria for addition of the milestone data and the business case data to the master report responsive to the execution options and to determining that the program includes the scheduled event within the time period specified by the filtering criteria.

11. A computer system comprising:
at least one processor; and
one or more tangible machine-readable media storing instructions for execution by the at least one processor, the instructions grouped into:
a selection criteria interface configured to receive, from a client device, a request to generate a master report that combines data from a program repository tool, a business case tool, and a product and production management tool, the request including filtering criteria to filter programs by one or more attributes associated with a development lifecycle of a program and execution options specifying at least one of a type of master report or data to be included within the master report;
a master report generator configured to:
obtain, from the program repository tool, a list of programs that have been previously approved for development;
identify, from the list of programs, programs that match the filtering criteria;
obtain release data, from the program repository tool, for each matching program;
obtain business case data, from the business case tool, for each matching program;
obtain program process data, from the product and production tool, for each matching program;
analyze data fields across the program repository tool, business case tool, and product and production tool based on comparison with one or more integrity rules defining conditions triggering identification of an issue and a manner of resolving the identified issue to detect data-integrity issues in the release data, the business case data, and the program process data, the data-integrity issues comprising one or more data fields that are empty, inconsistent, or include invalid data and that can be updated to resolve the data-integrity issues, at least some of the data-integrity issues resulting from inconsistencies between data stored by the repository tool, business case tool, and product and production tool;
generate a master report, in accordance with the execution options, that includes the release data, the business case data, the program process data, and the detected issues; and
a report interface configured to communicate the master report to the client device.

12. The computer system of claim 11, wherein the filtering criteria includes at least one of: a user identifier, a role for personnel assigned to a program, a delivery unit, a time period, a program status, or a program phase.

13. The computer system of claim 11, wherein the program process data includes data specifying a business process that includes one or more tasks involved in completing a development phase in a program.

14. The computer system of claim 11, wherein the business case data includes at least one of a program scope, an expected investment, or an expected return.

15. The computer system of claim 11, wherein the master report generator is further configured to generate a visual depiction of the process data for addition to the master report responsive to the execution options.

16. The computer system of claim 11, wherein the detected issues include issues of different levels of severity.

17. The computer system of claim 16, wherein the different levels of severity are represented by different colors being applied to portions of the release data, the business case data, and the program process data that cause the detected issues.

18. The computer system of claim 11, wherein the master plan generator is further configured to:
obtain, from the program repository tool, an action log for each matching program, the action logs each specifying status changes for the corresponding program; and
based on the action log, cluster the matching programs based on the status changes occurring within a time period specified by the filtering criteria for addition of the clustered matching programs in the master report responsive to the execution options.

19. The computer system of claim 18, wherein the master report generator is further configured to, based on the action log, cluster the matching programs further based on the status changes occurring within a determinable time period beyond the time period specified by the filtering criteria.

20. A non-transitory computer-readable storage medium storing instructions for causing a processor to implement operations, the operations comprising:
receiving, from a client device, a request to generate a master report that combines data from a program repository tool, a business case tool, and a product and production management tool, the request including filtering criteria to filter program by one or more attributes associated with a development lifecycle of a program and execution options specifying at least one of a type of master report or data to be included within the master report;
obtaining, from an interface provided by the program repository tool, a list of programs being developed;
identifying, from the list of programs, programs that match the filtering criteria;
obtaining release data, from the program repository tool, for each matching program;
obtaining business case data, from the business case tool, for each matching program;

obtaining program process data, from the product and production tool, for each matching program;

analyzing data fields across the program repository tool, business case tool, and product and production tool based on comparison with one or more integrity rules defining conditions triggering identification of an issue and a manner of resolving the identified issue to detect data-integrity issues in the release data, the business case data, and the program process data, the data-integrity issues comprising one or more data fields that are empty, inconsistent, or include invalid data and that can be updated to resolve the data-integrity issues, at least some of the data-integrity issues resulting from inconsistencies between data stored by the repository tool, business case tool, and product and production tool;

generating a master report that combines the release data, the business case data, and the program process data, and the detected issues; and communicating the master report to the client device.

* * * * *